(12) United States Patent
Russell et al.

(10) Patent No.: US 12,283,122 B2
(45) Date of Patent: Apr. 22, 2025

(54) ULTRA-WIDEBAND LOCATION GUIDED IMAGE CLASSIFICATION OF WIRELESS DEVICES FOR LABELING

(71) Applicant: MOTOROLA MOBILITY LLC, Wilmington, DE (US)

(72) Inventors: Michael E Russell, Lake Zurich, IL (US); Sridhar Vashist, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 421 days.

(21) Appl. No.: 18/051,997

(22) Filed: Nov. 2, 2022

(65) Prior Publication Data

US 2024/0144707 A1    May 2, 2024

(51) Int. Cl.
| | |
|---|---|
| *G06V 20/70* | (2022.01) |
| *G01S 13/74* | (2006.01) |
| *G01S 13/86* | (2006.01) |
| *G06V 10/764* | (2022.01) |

(52) U.S. Cl.
CPC ............ *G06V 20/70* (2022.01); *G01S 13/74* (2013.01); *G01S 13/867* (2013.01); *G06V 10/764* (2022.01)

(58) Field of Classification Search
None
See application file for complete search history.

(56) References Cited

U.S. PATENT DOCUMENTS

| | | | | |
|---|---|---|---|---|
| 10,242,036 B2* | 3/2019 | Kwon | ................ | G06V 10/758 |
| 10,460,287 B2* | 10/2019 | Pavani | ................ | G06T 7/0004 |
| 11,892,550 B2* | 2/2024 | Dawar | ................ | G01S 5/0244 |
| 12,112,224 B2* | 10/2024 | Hollar | ................ | G06V 20/52 |
| 12,137,388 B2* | 11/2024 | Nguyen | ................ | H04W 4/80 |
| 2019/0279017 A1* | 9/2019 | Graham | ................ | G06V 20/20 |
| 2022/0039059 A1* | 2/2022 | Nguyen | ................ | G01S 5/017 |
| 2022/0057471 A1* | 2/2022 | Padaki | ................ | G01S 5/0215 |

OTHER PUBLICATIONS

"Who We Are: Our Brands," no author given, by the Wi-Fi Alliance; Austin, TX, USA; posted on the Internet at wi-fi.org; copyright in the year 2024. (Year: 2024).*
"Brand Guide for Bluetooth Trademarks," no author given, by the Bluetooth Special Interest Group; Kirkland, WA, USA; posted on the Internet at bluetooth.com; dated Jun. 2022. (Year: 2022).*
Entry for "pseudocode" in the glossary on the website pc.net; published in the year 2009. (Year: 2009).*

* cited by examiner

*Primary Examiner* — Bernarr E Gregory
(74) *Attorney, Agent, or Firm* — Isidore PLLC

(57) ABSTRACT

An electronic device, a method, and a computer program product facilitate device labeling of devices that are ultra-wideband (UWB) capable. A controller of the electronic device identifies, via a wireless transceiver, proximity to device(s) including a first device that are UWB capable. The controller receives, via a UWB transceiver, UWB signals from a first device. The controller determines a location of the first device based on a range and an angle of arrival of the UWB signals. The controller receives an image stream from an image capturing device. The controller visually classifies an object corresponding to the first device in the image stream using a library of classification images that includes one or more classification images of one or more devices. The controller identifies an object classification associated with a device label for the first device. The controller assigns the device label to the first device.

18 Claims, 11 Drawing Sheets

ULTRA-WIDEBAND LOCATION GUIDED IMAGE CLASSIFICATION OF WIRELESS DEVICES FOR LABELING

BACKGROUND

1. Technical Field

The present disclosure relates generally to an electronic device that can wirelessly discover and connect to other wireless devices, and more particularly, electronic devices that locate other wireless devices to facilitate discovery and connection.

2. Description of the Related Art

User communication devices, including mobile phones, desktop workstations, laptops, and tablets, are often equipped with sensors, such as a camera and a microphone. With some communication devices, microphones and cameras can also be incorporated as peripheral devices. With additional built-in capabilities presented using a graphical user interface, user communication devices are increasingly being used to provide universal remote control functionality. With this feature, the user communication devices can be wirelessly connectable to control a number of external devices such as security systems, entertainment systems, smart appliances, and smart house subsystems.

An increasing number of other devices, such as devices used as part of the Internet of Things (IoT) and smart homes, are being enabled for wireless connection by presenting/broadcasting their associated wireless identifiers for connection by the user communication device. A user may discover that a large number of wireless devices are within proximity to the communication device. Attempting to connect to a particular wireless device may be a daunting task of trying to first identify a wireless identifier from a list of wireless addresses that are not particularly descriptive.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1A:
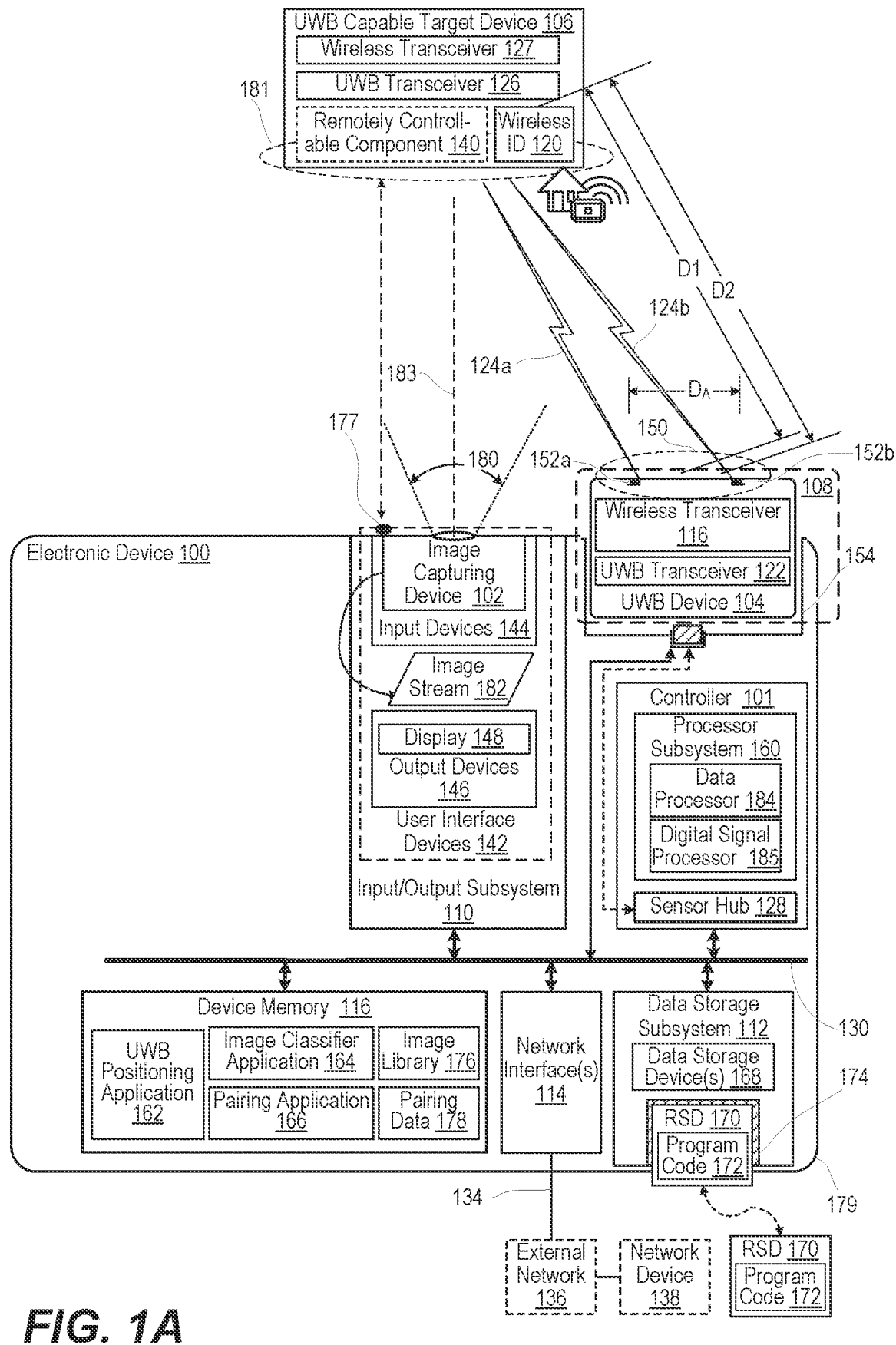
FIG. 1A depicts a functional block diagram of an electronic system having ultra-wideband (UWB) locating and visual image classification capabilities to automate device labeling of target devices, according to one or more embodiments.

According to one or more aspects of the present disclosure, an electronic device, a method, and a computer program product facilitate autonomous device labeling of external devices that are ultra-wideband (UWB) capable. A controller of the electronic device identifies, via a wireless transceiver, proximity to one or more devices, including a first device, that are UWB capable. The controller receives, via a UWB transceiver and an antenna assembly of the electronic device, UWB signals from a first device. The antenna assembly includes two or more antennas spaced in a support structure as one of a two-dimensional (2D) or a three-dimensional (3D) antenna array. The controller determines a location of the first device based on a range and an angle of arrival of the UWB signals received from the first device. The controller receives, from an image capturing device, an image stream depicting an area captured within a field of view that includes the location. The controller visually classifies an object corresponding to the first device in the image stream. In particular, the controller uses a library of classification images to classify the first device and to identify, for the first device, an object classification associated with a device label.

The device label includes generic classification descriptive terms for the object classification. Device labels may include manufacturer model or product nomenclature or other less generally recognizable information. The controller assigns the device label to the first device, which includes bonding information for reconnecting. In one or more embodiments, once the first device is labeled, the electronic device can monitor or reconnect the first device for tracking. The electronic device may store tracking data for purposes such as inventory tracking. The device label may be used with other features such as geofencing for alerts when a tagged pet leaves a home area.

In one or more embodiments, the first device includes remotely controllable components. The device label may contain information required to wirelessly connect with the remotely controllable components. Once the first device is labeled, the electronic device can access the device label information to facilitate communicatively connecting to the first device.

Ultra-wideband (UWB) is a radio technology that can use a very low energy level for short-range, high-bandwidth communications over a large portion of the radio spectrum. UWB has traditional applications in non-cooperative radar imaging. Most recent applications target sensor data collection, precise locating, and tracking. Ultra-wideband is a technology for transmitting information across a wide bandwidth (>500 MHz). This allows for the transmission of a large amount of signal energy without interfering with conventional narrowband and carrier wave transmission in the same frequency band. Regulatory limits in many countries allow for this efficient use of radio bandwidth and enable high-data-rate personal area network (PAN) wireless connectivity, longer-range low-data-rate applications, and the transparent co-existence of radar and imaging systems with existing communications systems.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1A is a functional block diagram of electronic device 100 in an operating environment within which the features of the present disclosure are advantageously implemented. Electronic device 100, managed by controller 101, includes image capturing device 102 utilized for visual classification of second devices (i.e., target device 106) within a field of view (FOV) of image capturing device 102. Electronic device 100 also has an integral or augmenting ultra-wideband (UWB) device 104 to automate device labeling of UWB capable target device 106. Electronic device 100 may be one of a host of different types of devices, including but not limited to, a computer terminal, a computer workstation, a laptop, a netbook, an ultra-book and/or a tablet computing device or similar device.

Referring now to the specific component makeup and the associated functionality of the presented components. Electronic device 100 may include communication subsystem 108, input/output subsystem 110, data storage subsystem 112, network interface(s) 114, and device memory 116 that are each communicatively coupled to and managed by controller 101. Communication subsystem 108 includes UWB device 104 having wireless transceiver 116 to communicate with target wireless transceiver 127 of UWB capable target device 106 to receive the device's wireless identification (ID) 120. UWB device 104 has local/integrated UWB transceiver 122 to receive UWB signals 124a-124b from remote UWB transceiver 126 of UWB capable target device 106. UWB device 104 may be directly communicatively coupled to electronic device 100, such as via sensor hub 128 or system interlink 130. Alternatively, electronic device 100 may connect to network device(s) 138 via network interface(s) 114 and network connection/cable 134 and external network 136.

In an example, UWB capable target device 106 may be a tracking tag that is attached to an object that is to be tracked. UWB capable target device 106 reports wireless ID 120 that is used to track the object. In another example, UWB capable target device 106 may include remotely controllable component 140, such as entertainment media player, security system, smart appliance, Internet of Things (IoT) sensor, etc. UWB capable target device 106 reports wireless ID 120 that is used to connect to and communicate with UWB capable target device 106. In particular, electronic device 100 includes user interface devices 142 to enable a user to remotely interact with remotely controllable component 140. User interface devices 142 includes input device(s) 144, such as image capturing device 102, and output device(s) 146, such as display 148. User interface devices 142 are at least a part of input/output subsystem 110 of electronic device 100.

UWB device 104 includes antenna assembly 150, which includes two or more antennas 152a-152b, spaced by distance "$D_A$" in support structure 154 ("accessory housing") as one of a two-dimensional (2D) or a three-dimensional (3D) antenna array. Each antenna 152a-152b may be a single antenna or may be an antenna module of closely positioned antenna elements. Controller 101 receives, via UWB transceiver 122, UWB signals 124a-124b from target device 106. Target device 106 may be at any angle and range to a plane of antenna assembly 150, creating respective distance "D1" and "D2" to each of antennas 152a-152b. Antennas 152a-152b and UWB transceiver 122 of UWB device 104 receive first and second UWB signals 124a-124b, which originate as the same UWB signal transmitted by UWB transceiver 126 of UWB capable target device 106. Controller 101 determines a location of UWB capable target device 106 based on a range and an angle of arrival of the received UWB signals 124a-124b. In an example, controller 101 of UWB device 104 determines the distances D1 and D2 based on Time of Flight (TOF) or Time of Arrival/Time-Difference-of-Arrival (TOA/TDOA) methods of first and second UWB signals 124a-124b received respectively by antennas 152a-152b. The difference between D1 and D2 indicates the angle of UWB capable target device 106 to the plane of antenna assembly 150.

Device memory 116 stores program code for applications, such as UWB positioning application 162, image classifier application 164, pairing application 166, and other application(s). In one or embodiments, the UWB capable target device 106 may act as a slave device to electronic device 100 that acts as master device using wireless protocol such as Bluetooth Low Energy (BLE). Pair application 166 enables the establishment of the BLE pairing between UWB capable target device 106 and electronic device 100 to enable automatic wireless connections. Device memory 116 further includes an operating system (OS), a firmware interface, such as basic input/output system (BIOS) or Uniform Extensible Firmware Interface (UEFI), and firmware.

Data storage subsystem 112 of electronic device 100 includes data storage device(s) 168. Controller 101 is communicatively connected, via system interlink 130, to data storage device(s) 168. Data storage subsystem 112 provides applications, program code, and stored data on nonvolatile storage that is accessible by controller 101. For example, data storage subsystem 112 can provide a selection of applications and computer data such as UWB positioning application 162, image classifier application 164, and pairing application 166 that are loaded into device memory 116 for execution by controller 101. In one or more embodiments, data storage device(s) 168 can include hard disk drives (HDDs), optical disk drives, and/or solid-state drives (SSDs), etc. Data storage subsystem 112 of electronic device 100 can include one or more non-transitory computer readable storage devices or computer readable storage devices, such as removable storage device (RSD) 170, that contains program code 172 and that is received in RSD interface 174. Controller 101 is communicatively connected to RSD 170, via system interlink 130 and RSD interface 174. Controller 101 can access RSD 170 to provision electronic device 100 with program code 172, such as code for UWB positioning application 162 and related computer data, that when executed by controller 101, configures electronic device 100 to perform several of the functionality described herein. In an example, image classifier application 164 uses a library of classification images ("image library") 176. Pairing application 166 uses and updates pairing data 178.

I/O subsystem 110 includes user interface devices 142, such as display 148, that presents a user interface. I/O subsystem 110 includes image capturing device 102 that has a field of view (FOV) 180 that may encompass location 181 of UWB capable target device 106. Image capturing device 102 generates image stream 182 that is utilized for classification by image classifier application 164. Image capturing device 102 may include direction and distance measurement 183 for objects at location 181 that is conveyed to image classifier application 164. In one or more embodiments, image capturing device 102 includes multiple spaced camera that enable identifying distance to an object based on the stereoscopic differences between multiple received image streams. In one or more embodiments, image capturing device 102 includes autofocusing that indicates distance to an object within the image stream. In one or more embodiments, image capturing device 102 includes or is augmented by range finding sensor 177, such as an infra-red sensor, lidar, radar, etc.

I/O subsystem 110 may include acceleration/movement sensor(s), vibration output device, light output device, image capturing device(s), microphone(s), touch/haptic controls, and audio output device(s). I/O subsystem 110 also may include an I/O controller. The I/O controller provides communication and power signals to functional components described herein as part of communication subsystem 108, I/O subsystem 110, data storage subsystem 112, or device memory 116. The I/O controller connects via a system interlink 130 to internal devices, which are internal to housing 179, and via an electrical cable to tethered peripheral devices, which are external to housing 179 of electronic device 100. Internal devices can include computing, storage, communication, or sensing components depicted within housing 179. The I/O controller supports the necessary configuration of connectors, electrical power, communication protocols, and data buffering to act as an interface between internal devices and peripheral devices tethered by the electrical cable and other components of electronic device 100 that use a different configuration for inputs and outputs.

Network interface(s) 114 can include a network interface controller (NIC) with a network connection/cable 134 connection to external network 136. Network connection/cable 134 may include wireless and/or wired links. Network interface(s) 114 support one or more network communication protocols. External network 136 can be a local area network (LAN), a campus area network (CAN), a metropolitan area network (MAN), or a wide area network (WAN). For example, network connection/cable 134 can be an Ethernet connection/cable.

Controller 101 manages, and in some instances directly controls, the various functions and/or operations of electronic device 100. These functions and/or operations include, but are not limited to including, application data processing, communication with second communication devices, navigation tasks, image processing, and signal processing. In one or more alternate embodiments, electronic device 100 may use hardware component equivalents for application data processing and signal processing. For example, electronic device 100 may use special purpose hardware, dedicated processors, general purpose computers, microprocessor-based computers, micro-controllers, optical computers, analog computers, dedicated processors and/or dedicated hard-wired logic.

Controller 101 may include or consist essentially of processor subsystem 160, which includes one or more central processing units (CPUs), depicted as data processor 184. Processor subsystem 160 can include one or more digital signal processors 185 that are integrated with data processor 184. Processor subsystem 160 can include other processors that are communicatively coupled to data processor 184, such as sensor hub 128. Data processor 184 is communicatively coupled, via system interlink 130, to device memory 116. In one or more embodiments, data processor 184 is communicatively coupled via system interlink 130 to communication subsystem 108, I/O subsystem 110, data storage subsystem 112 and network interface(s) 114. In one or more embodiments, controller 101 may include sensor hub 128. Sensor hub 128 is a microcontroller unit/coprocessor/digital signal processor (DSP) set that helps to integrate data from different sensors and process the sensor data, reducing overhead processing burden for data processor 184. Sensor hub 128 expends less power than other processors of processor subsystem 160 such as data processor 184. Sensor hub 128 may be active when data processor 184 is inactive to reduce power consumption.

System interlink 130 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 130) are illustrated in FIG. 1A, it is to be understood that more, fewer, or different interconnections may be present in other embodiments.

Figure 1B:
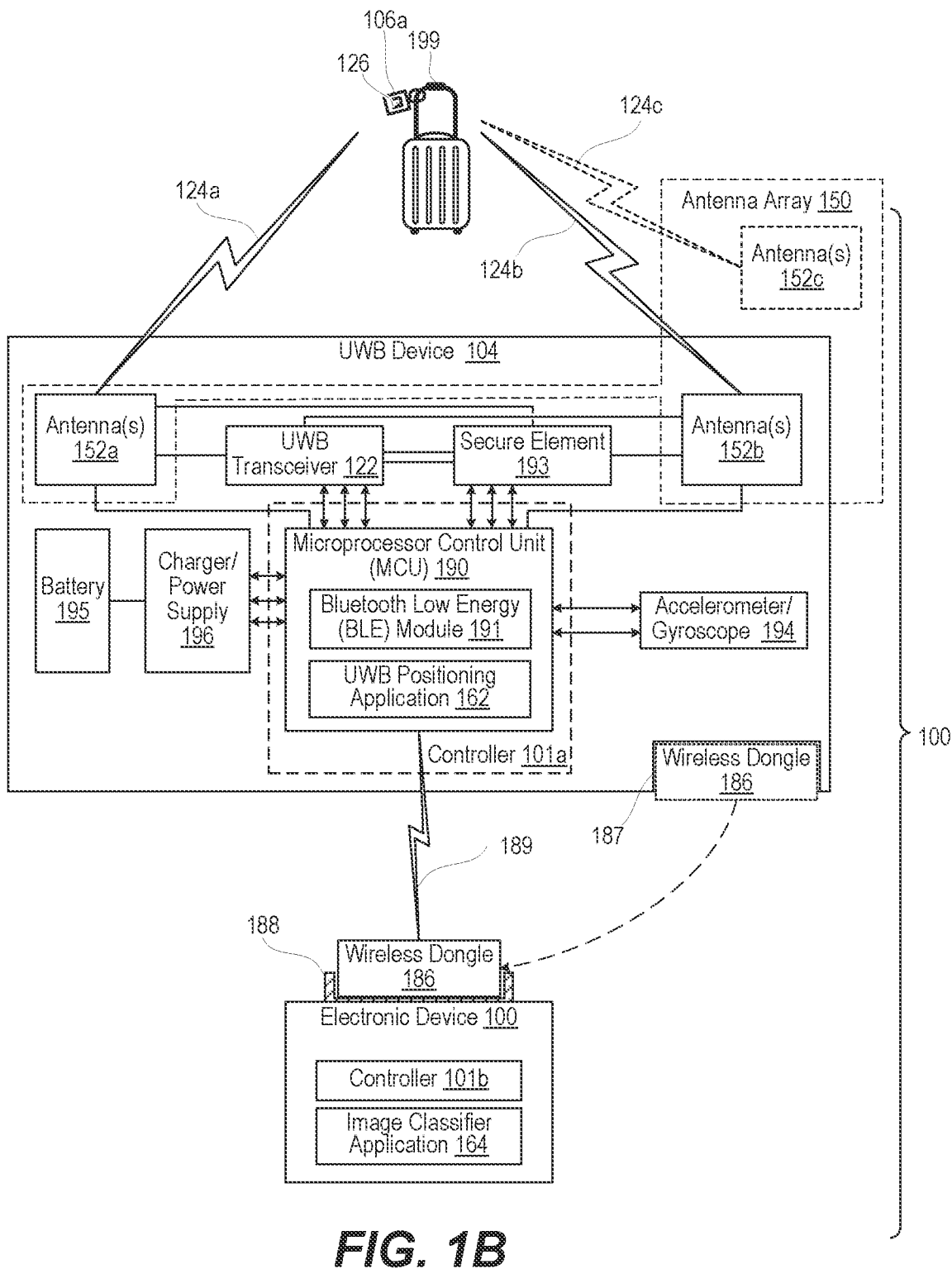
FIG. 1B is a diagram of an example UWB device that augments an electronic system or communication system to provide UWB locating capability, according to one or more embodiments.

FIG. 1B is a diagram of example electronic device 100 augmented by UWB device 104. UWB device 104 is utilized for locating UWB capable tag device 106a tagged to object 199. UWB device 104 includes a wireless dongle 186 that may be stowed in receptacle 187 prior to being inserted into a port, such as female universal serial bus (USB) port 188 of electronic device 100. UWB device 104 is wirelessly communicatively coupled, such as via Bluetooth Low Energy (BLE) communication link 189 and wireless dongle 190, to electronic device 100. In an example, UWB device 104 includes controller 101a having microprocessor control unit (MCU) 190 that executes UWB positioning application 162. MCU 190 further includes BLE module 191 to communicatively connect to wireless dongle 186. Electronic device 100 includes controller 101b that executes image classifier application 164 that configures electronic device 100 to visually classify a UWB capable target device 106 located by UWB device 104.

In addition to UWB transceiver 122, controller 101a is communicatively coupled to secure element 193 that stores public-private encryption keys. Controller 101a is communicatively coupled to accelerometer/gyroscope 194 to be responsive to movements that may affect distance and direction determinations. Battery 195 and charger/power supply 196 provide power to UWB device 104. UWB device 104 may include at least a third antenna 152c, spaced apart from both first and second antennas 152a-152b of antenna assembly 150 to form a 3D antenna array. Third antenna 152c receives third UWB signal 124c that may be phase shifted from first and second UWB signals 124a-124b, based on having a different TOF or TOA/TDOA due to a location of target device 106 relative to antenna assembly 150.

In one or more embodiments, electronic device 100 provides accurate relative position tracking. In one or more embodiments, communication subsystem 108 of electronic device 100 is an implementation of IEEE 802.15.4z-2020, which is the IEEE Standard for Low-Rate Wireless Networks—Amendment 1: Enhanced Ultra-Wideband (UWB) Physical Layers (PHYs) and Associated Ranging Techniques. UWB offers highly precise positioning, within 10 cm of ranging accuracy at as little as 3 degrees of precision through Time-of-Flight (ToF) and Angle-of-Arrival (AoA) measurements at up to 100 m through the use of Impulse Radio techniques in the 6-10 GHz frequency range. The IEEE 802.15.4 standard is an example of UWB positioning that is accurate and secure, versus other technologies. Aspects of the present disclosure may incorporate other UWB positioning methodologies.

Figure 2:
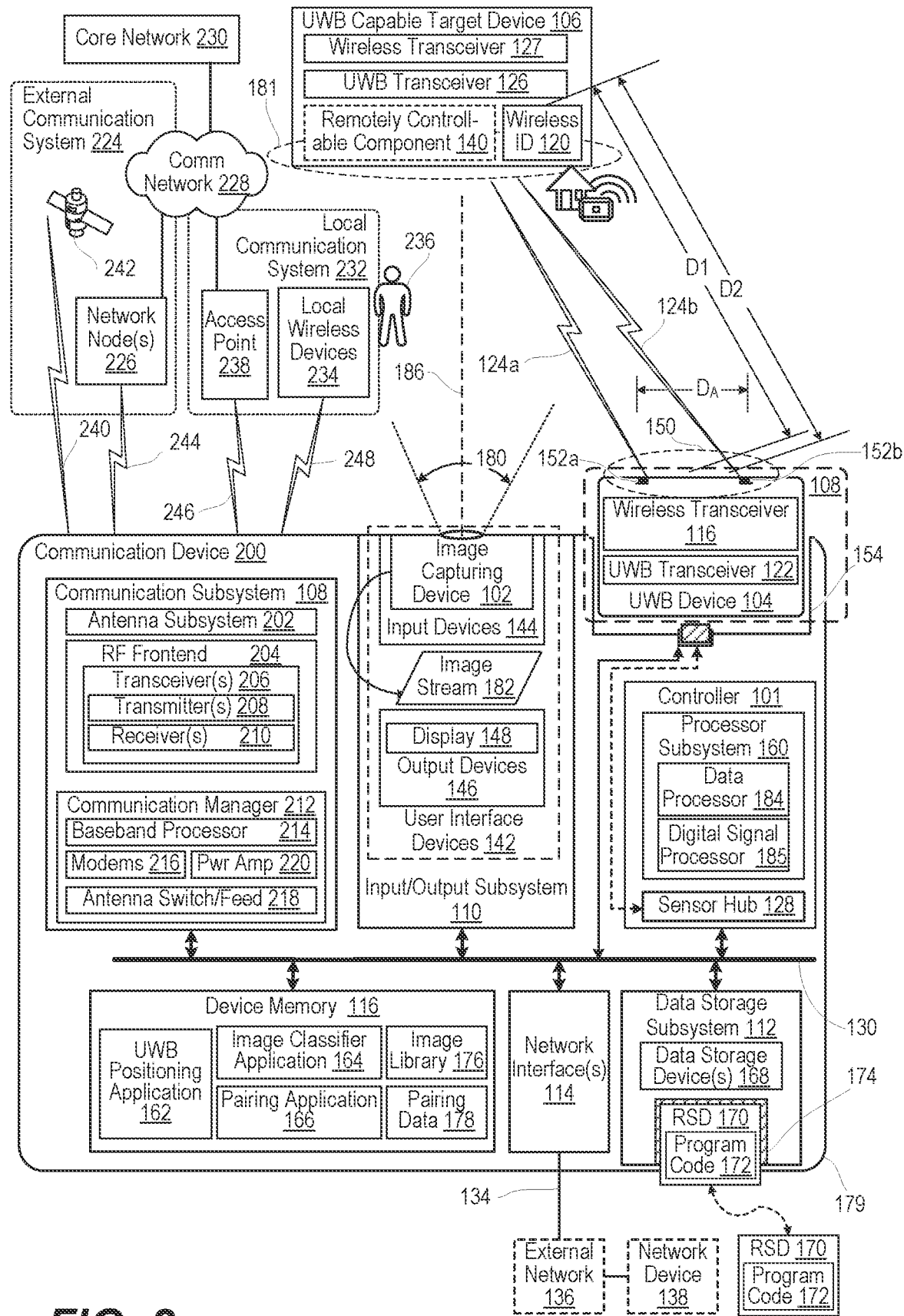
FIG. 2 depicts a functional block diagram of a communication system having UWB locating and visual image classification capabilities to automate device labeling of target devices, according to one or more embodiments.

FIG. 2 depicts a functional block diagram of communication device 200 having UWB locating and visual image classification capabilities to automate device labeling of target devices. Communication device 200 is an implementation of electronic device 100 (FIG. 1A) and may include similar or identical components. In addition, communication subsystem 108 supports cellular and/or wireless wide area communication capabilities. As an electronic device supporting cellular and wireless communication, communication device 200 can be utilized as, and also be referred to as, a smartphone, system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

In addition to antenna assembly 150, communication subsystem 108 includes antenna subsystem 202 that cellular and wireless communication protocols. Radio frequency (RF) frontend 204 of communication subsystem 108 has one or more transceivers 206 that includes one or more transmitters 208 and one or more receivers 210. Communication manager 212 includes baseband processor 214 and one or more modems 216. RF frontend 204 includes antenna switching and feed networks 218 to connect particular antennas of antenna subsystem 202 at a selected phase delay and in particular combinations. Power amplifier systems 220 of RF frontend 204 set the transmit power levels provided to antennas of antenna subsystem 202 connected by antenna switching and feed networks 218.

Baseband processors 214 communicates with controller 101 and RF frontend 204. In one or more embodiments, baseband processors 214 perform a primary or support function as part of controller 101. Communication subsystem 108 communicates with external communication system 224. Baseband processor 214 operates in baseband frequency range to encode data for transmission and decode received data, according to a communication protocol. Baseband modems 216 modulate baseband encoded data from corresponding communication manager 212 onto a carrier signal to provide a transmit signal that is amplified by power amplifiers in transmitters 208 and delivered to antennas of antenna subsystem 202. Baseband modems 216 encode uplink signals and decode downlink signals that are communicated. Baseband modems 216 demodulate received signals from external communication system 224 detected by antenna subsystem 202. The received signal is amplified and filtered by receivers 210, which demodulate received encoded data from a received carrier signal. In an example, communication subsystem 108 communicates with cellular base or network nodes 226 that are part of one or more radio access network (RANs) to connect to communication network(s) 228. Communication network(s) 228 may be communicatively connected to core network 230.

Antenna subsystem 202 supports communication with local communication system 232. Local communication system 232 can include localized or personal wireless devices 234, such as a wireless headset, head mounted display, and a smart watch worn by user 236. Local communication systems 232 can further include access nodes 238 for wireless communication. Communication devices 200 can be provided communication services by wide area network(s) that are part of external communication system 224 and linked to access nodes 238. Wide area network(s) may also provide data services to communication network(s) 228 that provide communication service to communication device 200 via network nodes 226.

In one or more embodiments, communication subsystem 108 receives satellite broadcast signals 240 from GPS satellites 242 to obtain geospatial location information. Communication subsystem 108 communicates with network nodes 226 via uplink/downlink channels 244. Communication subsystem 108 can communicate with access node 238 via transmit/receive signals 246. Communication subsystem 108 communicates with localized or personal wireless device 234 via transmit/receive signals 248.

In one or more embodiments, controller 101, via communication subsystem 108, performs multiple types of cellular over-the-air (OTA) or wireless communication with external communication system 224. Communication subsystem 108 can communicate via Bluetooth connection with one or more personal access network (PAN) devices such as localized or personal wireless devices 234. Communication via Bluetooth connection includes both transmission and reception via a Bluetooth transceiver device. In one or more embodiments, communication subsystem 108 communicates with one or more locally networked devices via a wireless local area network (WLAN) link provided by access node 238. In one or more embodiments, access node 238 supports communication using one or more IEEE 802.11 WLAN protocols (e.g., "Wi-Fi"). Access node 238 is connected to wide area network(s), such as the Internet.

Figure 3:
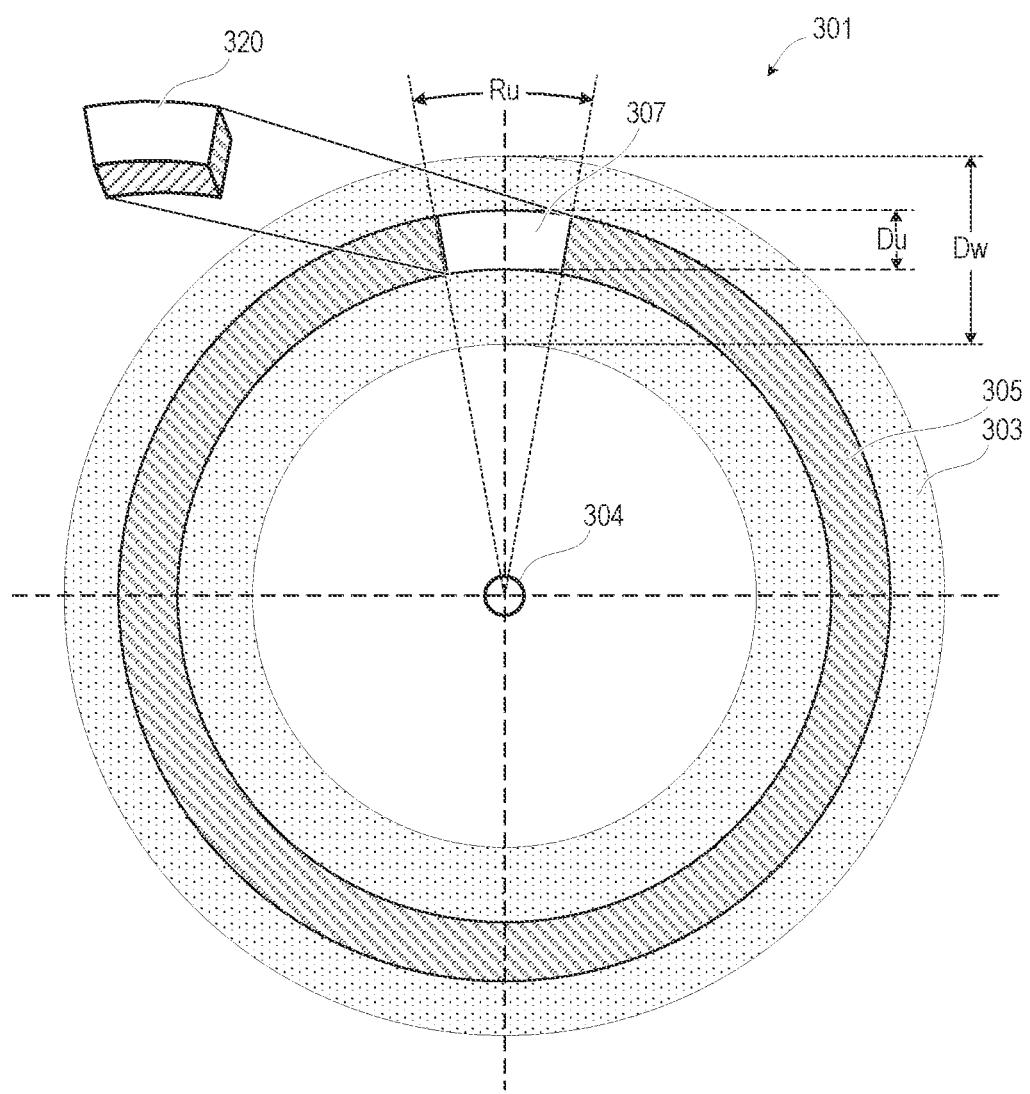
FIG. 3 is a graphical comparison of positioning sensing capabilities of UWB to other radio frequency (RF) wireless technologies, according to one or more embodiments.

FIG. 3 presents a graphical comparison 301 of positioning sensing capabilities of UWB to BLE and Wi-Fi technologies. Conventional radio frequency (RF) technologies such as BLE and Wi-Fi wireless technologies resolve distance to a relatively large annular ring 303 around center 304 of width "Dw" with UWB capable of distance measurement in a narrow annular ring 305 of width "Du". With 2D or 3D measurements, UWB positioning locates a UWB target within an angular range 307 of radial angle "Ru". For clarity, graphical comparison 301 is depicted in two dimensions, with the addition of a third distance measurement, UWB capable target device 106 (FIG. 1A) is located within small, three-dimensional volume 320.

The use of the scrambled timestamp sequence (STS), Cryptographically Secure Pseudo-Random Number Generation, and other features of the UWB PHY, makes UWB an extremely secure positioning technology. Using UWB positioning addresses deficiencies that may exist with using Received Signal Strength Indication (RSSI) for other RF communication technologies. RSSI methods for determining proximity are less accurate due to deep fades or cross-body pathloss, which can be as much as 15-20 dB. The expected pathloss without such obstacles is a 6 dB reduction with each doubling of distance in free space. According to aspects of the present innovation, a UWB transceiver incorporates Impulse Response Ultra-wideband (IR-UWB) capabilities that use Time-of-Flight (TOF) or Time-of-Arrival/Time-Difference-of-Arrival (TOA/TDOA) for accurate distance measurement. The UWB transceiver does not suffer from the rapid changes in apparent distance with path loss swings since signal attenuation due to traveling through a lossy medium does not as measurably affect the time of arrival as long as the signal is above a receiver sensitivity threshold.

Figure 4A:
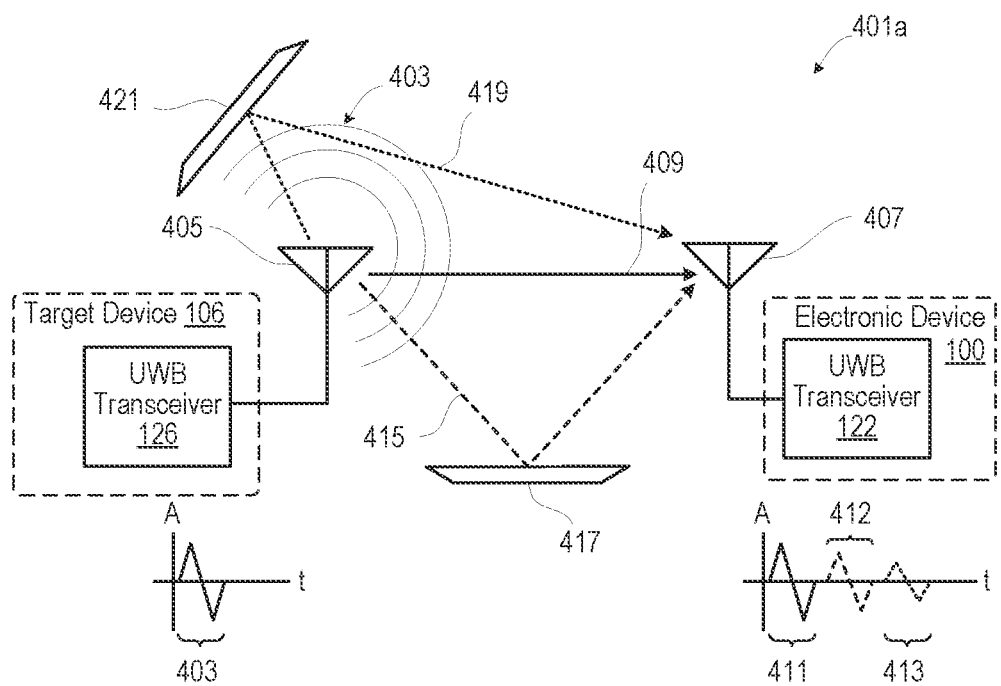
FIG. 4A is a diagram presenting Line of Sight (LoS) sensing using UWB transceivers, according to one or more embodiments.

Some of these capabilities may be demonstrated by comparing UWB positioning based on when a dominant signal is received that is Line of Sight (LoS) to when a dominant signal is received that is Non-Line of Sight (NLoS). FIG. 4A is a diagram 401a presenting LoS sensing based on a UWB signal 403 transmitted by UWB transceiver 126 of target device 106 from transmit antenna 405. In an example, UWB signal 403 is received at receiving antenna 407 of UWB transceiver 122 of electronic device 100 along three paths. A first path is direct path 409 that is the shortest, and thus, a corresponding first received signal 411 is received first. Without electromagnetic property differences along direct path 409, first received signal 411 is expected to arrive with the greatest amplitude as compared to second and third received signals 412 and 413 that are multipath. In particular, second received signal 412 follows second path 415 having a distance longer than direct path 409 by reflecting off of forward surface 417. Based on attenuation due to propagation distance, second received signal 412 has a lower amplitude and is received subsequent to first received signal 411. Third received signal 413 follows third path 419 having a distance that is longer than both direct path 409 and second path 415 by reflecting back from aft surface 421. Based on attenuation due to propagation distance, third received signal 413 has a lowest amplitude and is received subsequent to both first and second received signals 411 and 412. Without a cause of pathloss other than caused by distance, distance may be determined based on the signal amplitude of the first, second, and third received signals 411-413, as in other conventional RF measurement techniques.

Figure 4B:
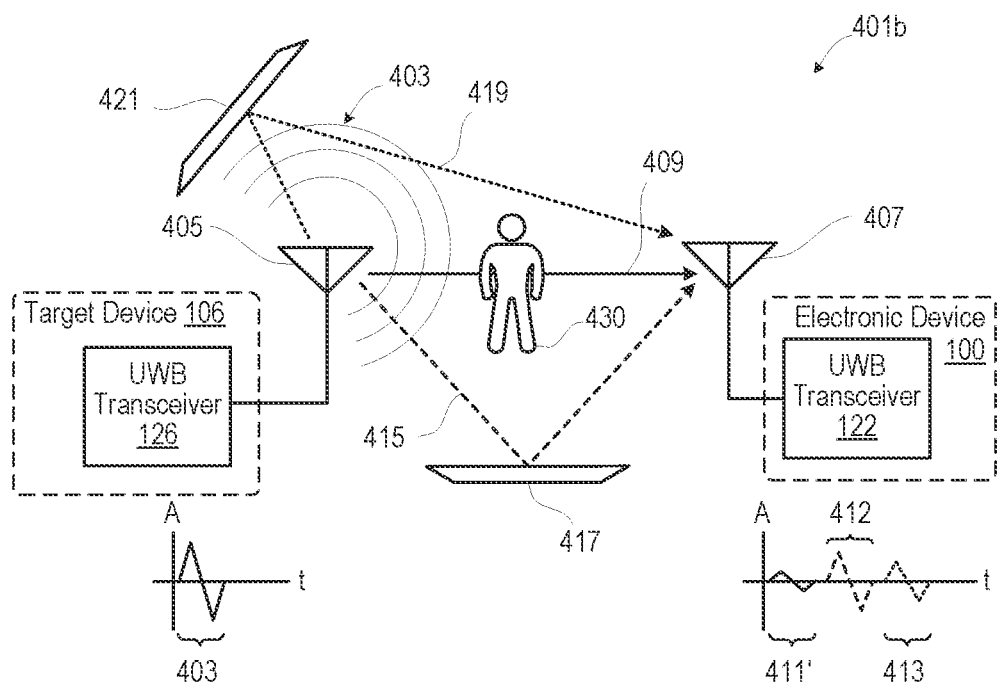
FIG. 4B is a diagram presenting Non-Line of Sight (NLoS) sensing using UWB transceivers, according to one or more embodiments.

FIG. 4B is a diagram 401b presenting NLoS sensing with a lossy obstacle, such as person 430, in a direct path between transmit antenna 405 of target device 106 and receive antenna 407 of electronic device 100. First received signal 411' is attenuated by person 430. Otherwise, diagram 401b is identical to diagram 401a (FIG. 4A). Even with the attenuation, UWB transceiver 122 may still accurately provide positioning of target device 106 based on first arrival of first received signal 411' so long as the received amplitude is sufficient for receiver sensitivity of UWB transceiver 122. The advertising by UWB transceiver 122 that prompts transmission of UWB signal 403 enables electronic device 100 to determine that first received signal 411' is received from direct path 409. The impulse characteristics and timing UWB signal 403 are prompted by electronic device 100. Unlike conventional RF measurement techniques, UWB transceiver 122 identifies the first received signal 411' even when of lower amplitude than a later received signal such second received signal 412. Thus, distance measured is accurately based on direct path 409 and not an unpredictable multi-path distance such as second path 415. The UWB locating protocol implements UWB signaling whose timing and duration facilitate distinguishing direct path signals from multiple path signals, enhancing overall distance accuracy.

Figure 5:
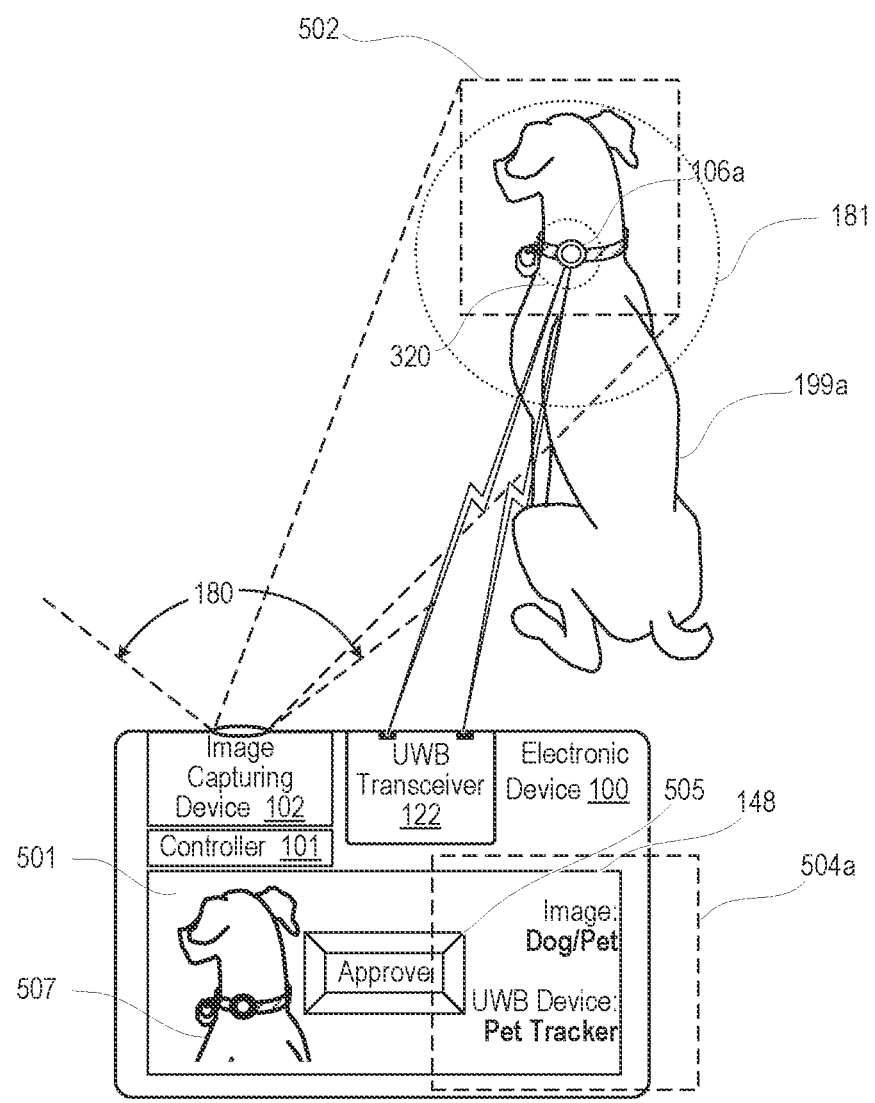
FIG. 5 is front view of the electronic device having a display presenting a user interface for device label selection of a UWB tag device attached to a pet, according to one or more embodiments.

FIG. 5 is front view of electronic device 100 having display 148 presenting user interface 501 for device label selection of UWB tag device 106a attached to object 199a that is a pet. UWB transceiver 122 of electronic device 100 locates UWB tag device 106a within a small three-dimensional volume 320. Image capturing device 102 has FOV 180. Electronic device identifies region of interest (ROI) 502 within FOV 180 that includes small three-dimensional volume 320. Image capturing device 102 mechanically and/or digitally focuses on ROI 502. Image capturing device 102 looks for objects within image stream 182 (FIG. 1A) Using classification images for comparison, image capturing device 102 visually classifies UWB tag device 106a. Having identified UWB tag device 106a as intended to be attached to an object to be tracked, image capturing device 102 looks for object 199 within ROI 502 that is in close proximity to or contact with UWB tag device 106a. Using classification images for comparison, image capturing device 102 visually classifies object 199 at location 181 as pet or dog. Display 148 presents device label 504a of one or more proposed visual classifications and identification of UWB tag device 106a such as: "IMAGE: Dog/Pet" and "UWB Device: Pet Tracker". In an example, control button 505 is presented to enable user control by touching control button 505. In other examples, other types of user controls may be provided such as verbal or gesture. User control is received to select or concur on device label 504a. In one or more embodiments, device label 504a appears when the corresponding object is included in camera view 507. In one or more embodiments, the corresponding object is annotated in camera view 507 to provide a visual indication of the object that is classified.

For clarity, image capturing device 102 is described as having the functionality for performing visual classification. In one or more embodiments, image capturing device 102 may inherently include processing functionality that is part of controller 101. In one or more embodiments, image capturing device 102 is supervised by controller 101 to perform certain functions. In one or more embodiments, controller 101 performs one or more tasks to visually classify objects as post processing task after receiving image stream 182 (FIG. 1A) from image capturing device 102. In an example, controller 101 identifies ROI 502 within image stream 182 (FIG. 1A) based in part on information of a boresight and focus direction of image capturing device 102. Controller 101 performs object recognition to distinguish objects from a background in ROI 502. Controller 101 compares or correlates classification images to the objects to find a highest probability match. Controller 101 accesses device label information associated with the classification.

Figure 6:
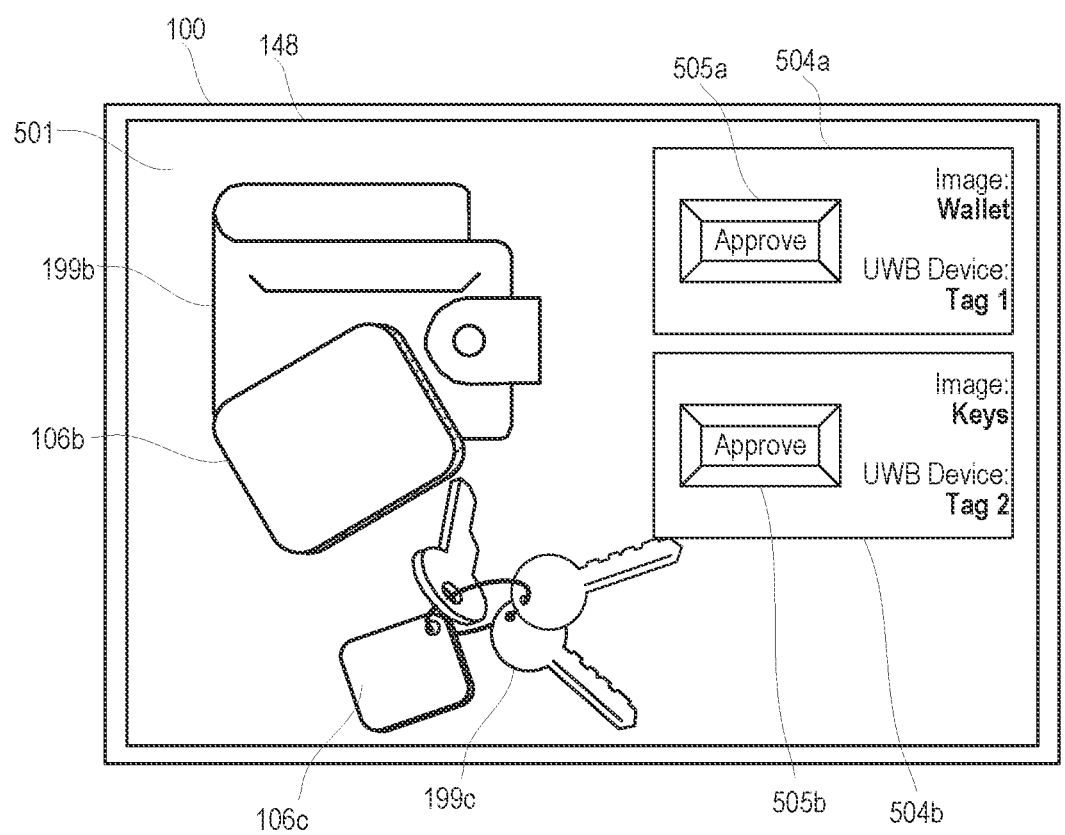
FIG. 6 is front view of the electronic device having a display presenting a user interface for device label selection of UWB tag devices positioned with a wallet and a key ring, according to one or more embodiments.

FIG. 6 is front view of display 148 of electronic device 100 presenting user interface 501 for device label selection of UWB tag devices 106b-106c, positioned with objects 199b-199c. Within the illustrative embodiment, UWB tag devices 106b-106c are a card tag device and key chain fob device, respectively, and objects 199b-199c are a wallet and a key ring, respectively. Control selections 505a-505b are received to confirm identified and classified device labels 504b-504c respectively: "Image: wallet/UWB Device: Tag 1" and "Image: Keys/UWB Device: Tag 2".

Figure 7A:
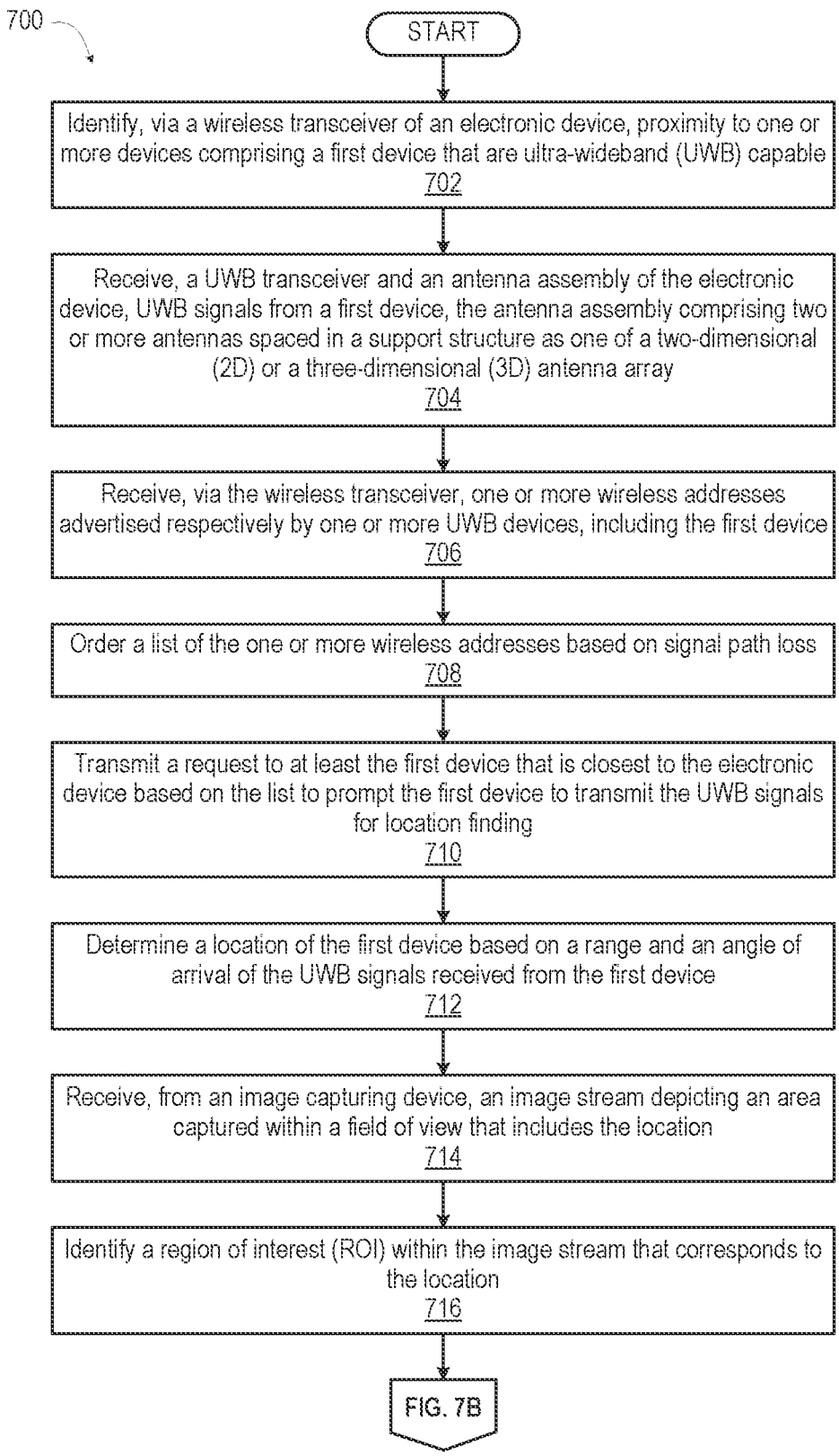
FIGS. 7A-7B (collectively "FIG. 7") are a flow diagram presenting a method for automating device labeling of a device using UWB locating and visual image classifying, according to one or more embodiments.
Figure 7B:
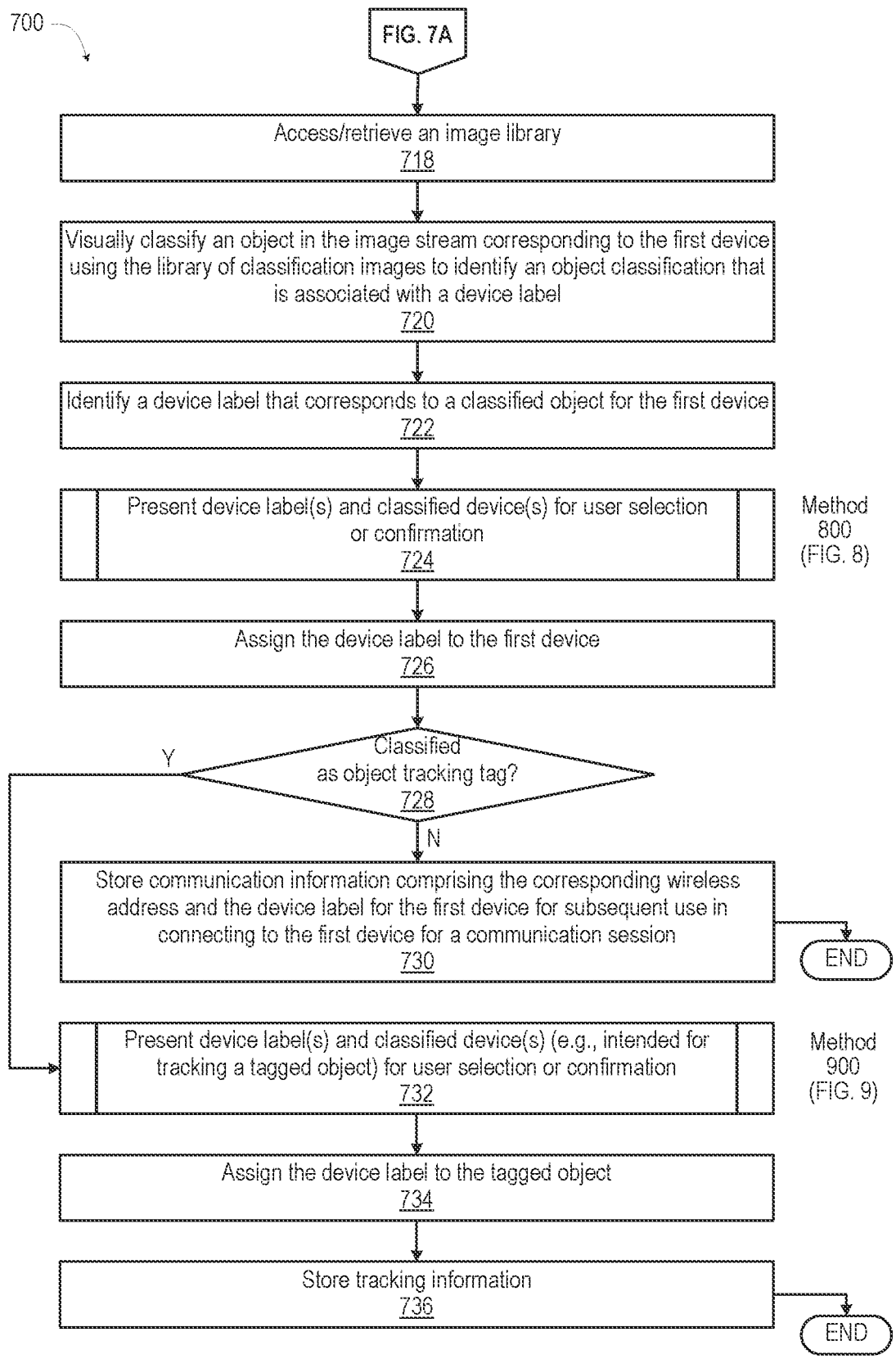
Figure 8:
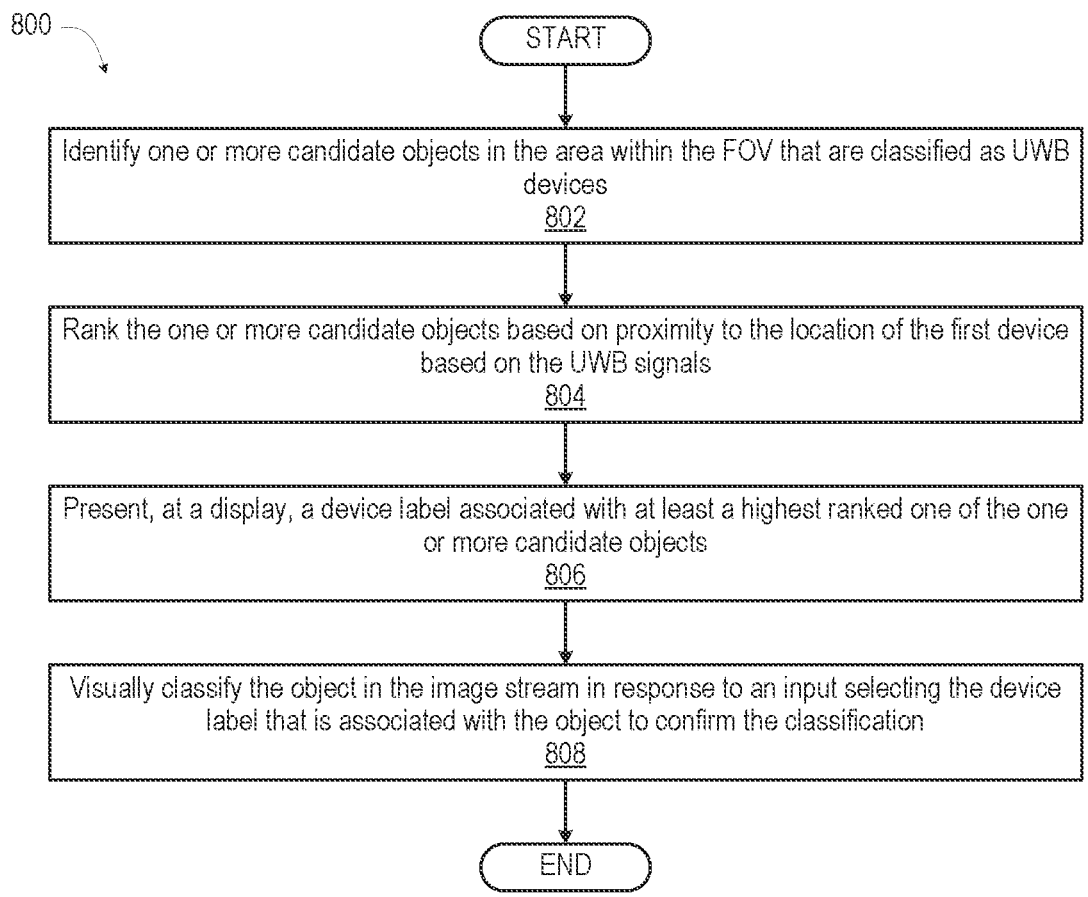
FIG. 8 is a flow diagram presenting a method for presenting candidate device labels and device identification for user selection or confirmation, according to one or more embodiments.
Figure 9:
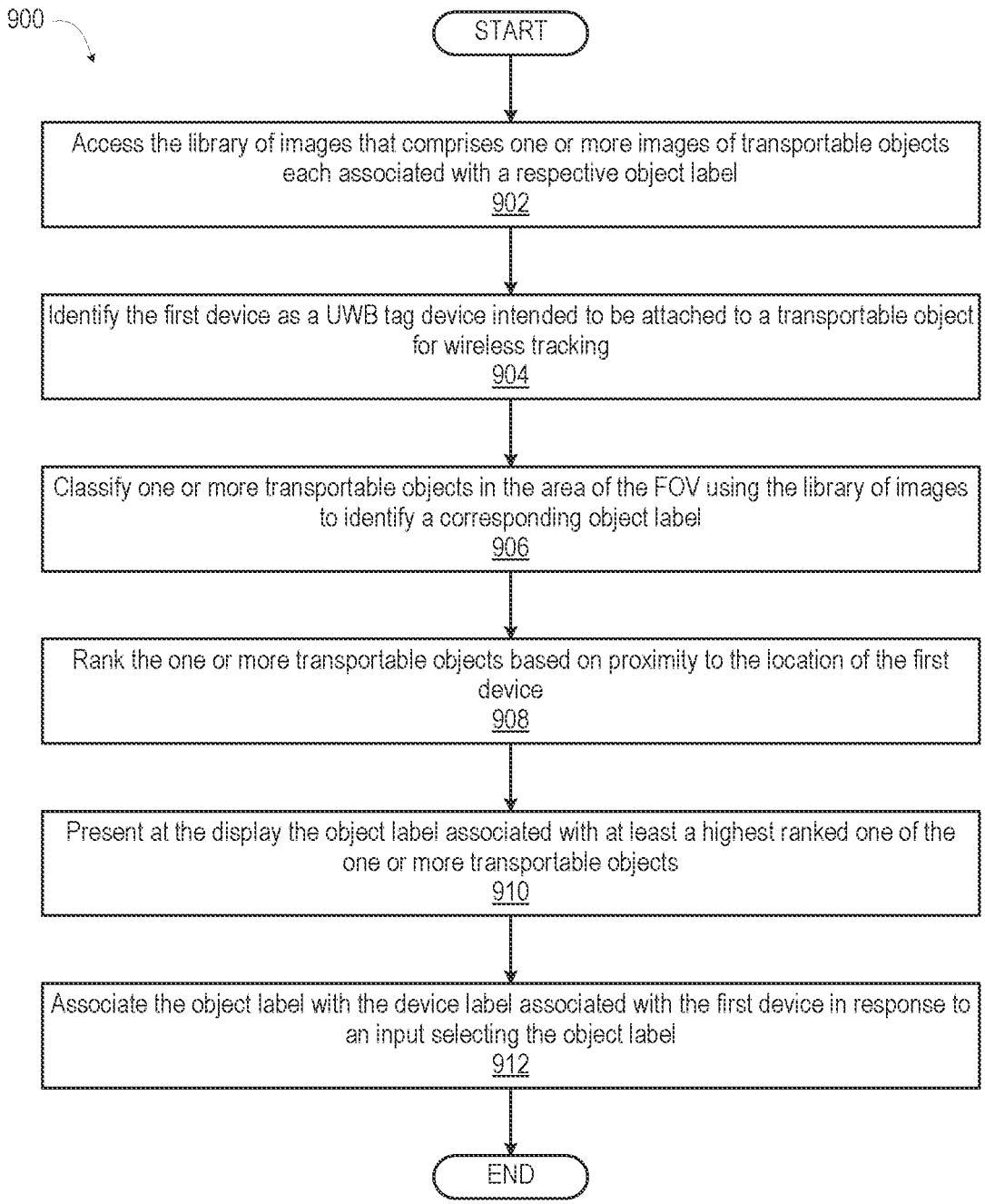
FIG. 9 is a flow diagram presenting a method for identifying, ranking, and presenting candidate device labels and tagged object identification for user selection or confirmation, according to one or more embodiments.

FIGS. 7A-7B (collectively "FIG. 7") are a flow diagram presenting method 700 for automating device labeling of a device using UWB locating and visual image classifying. FIG. 8 is a flow diagram presenting method 800 for presenting candidate device labels and device identification for user selection or confirmation. FIG. 9 is a flow diagram presenting method 900 for presenting candidate device labels and tagged object identification for user selection or confirmation. Methods 800 (FIG. 8) and 900 (FIG. 9) are implementations of features introduced in method 700 (FIG. 7). The description of methods 700 (FIG. 7), 800 (FIG. 8) and 900 (FIG. 9) are provided with general reference to the specific components illustrated within the preceding FIGS. 1A-1B, 2, 3, 4A-4B, 5, and 6. Specific components referenced in methods 700 (FIG. 7), 800 (FIG. 8), and 900 (FIG. 9) may be identical or similar to components of the same name used in describing preceding FIGS. 1A-1B, 2, 3, 4A-4B, 5, and 6. In one or more embodiments, controller 101 configures electronic device 100 (FIGS. 1A-1B) or communication device 200 (FIG. 2) to provide functionality of methods 700 (FIG. 7), 800 (FIG. 8), and 900 (FIG. 9).

With reference to FIG. 7, method 700 includes identifying, via a wireless transceiver of an electronic device, proximity to one or more devices comprising a first device that is ultra-wideband (UWB) capable (block 702). Method 700 includes receiving, via a UWB transceiver and an antenna assembly of the electronic device, UWB signals from the first device, the antenna assembly comprising two or more antennas spaced in a support structure as one of a two-dimensional (2D) or a three-dimensional (3D) antenna array (block 704). Method 700 includes receiving, via the wireless transceiver, one or more wireless addresses advertised respectively by one or more UWB devices, including the first device (block 706). Method 700 includes ordering a list of the one or more wireless addresses based on signal path loss (block 708). Path loss, or path attenuation, is the reduction in power density of an electromagnetic wave as the electromagnetic wave propagates through space. Path loss is deterministic and theoretical based on the physics of wave propagation. Using path loss alone assumes the signal attenuation is only due to distance and not other characteristics of the channel between transmitter and receiver. Method 700 includes transmitting a request to at least the first device that is closest to the electronic device, based on the list, to prompt the first device to transmit the UWB signals for location finding (block 710). Method 700 includes determining a location of the first device based on a range and an angle of arrival of the UWB signals received from the first device (block 712). Method 700 includes receiving, from an image capturing device, an image stream depicting an area captured within a field of view that includes the location (block 714). Method includes identifying a region of interest (ROI) within the image stream that corresponds to the location (block 716). Then method 700 proceeds to block 718 of FIG. 7B.

With reference to FIG. 7B, method 700 includes accessing/retrieving an image library (block 718). Method 700 includes visually classifying an object in the image stream corresponding to the first device using the library of classification images to identify an object classification that is associated with a device label (block 720). Method includes identifying a device label that corresponds to a classified object for the first device (block 722). In one or more embodiments, method 700 includes presenting device label (s) and classified devices(s) for user selection or confirmation (block 724). An example implementation is provided as method 800 (FIG. 8) described below. Method 700 includes assigning the device label to the first device (block 726). In one or more embodiments, method 700 includes determining whether the classified device is an object tracking tag (decision block 728). In response to determining that the first device is not classified as an object tracking tag, method 700 includes storing communication information comprising the corresponding wireless address and the device label for the first device for subsequent use in connecting to the first device for a communication session (block 730). Then method 700 ends. presenting device label(s) and classified tagged object(s) for user selection or confirmation (block 722). An example implementation is provided as method 900 (FIG. 9) described below. In response to determining that the first device is classified as an object tracking tag, method 700 includes presenting data label(s) and classified tagged object(s) for user selection or confirmation (block 732). An example implementation is provided as method 900 (FIG. 9) described below. Method 700 includes assigning the device label to the tagged object (block 734). Method includes storing the tracking information (block 736). Then method 700 ends.

With reference to FIG. 8, method 800 includes identifying one or more candidate objects in the area within the FOV that are classified as UWB devices (block 802). Method 800 includes ranking the one or more candidate objects based on proximity to the location of the first device based on the UWB signals (block 804). Method 800 includes presenting, on a display, a device label associated with at least a highest ranked one of the one or more candidate objects (block 806). Method 800 includes visually classifying the object in the image stream in response to an input selecting the device label that is associated with the object to confirm the classification (block 808). Then method 800 ends.

With reference to FIG. 9, method 900 includes accessing the library of images that comprises one or more images of transportable objects each associated with a respective object label (block 902). Method 900 includes identifying the first device as a UWB tag device intended to be attached to a transportable object for wireless tracking (block 904). Method 900 includes classifying one or more transportable objects in the area of the FOV using the library of images to identify a corresponding object label (block 906). Method 900 includes ranking the one or more transportable objects based on proximity to the location of the first device (block 908). Method 900 includes presenting, on the display, the object label associated with at least a highest ranked one of the one or more transportable objects (block 910). Method 900 includes associating the object label with the device label associated with the first device in response to an input selecting the object label (block 912). Then method 900 ends.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
   an antenna assembly comprising two or more antennas spaced in a support structure as one of a two-dimensional (2D) or a three-dimensional (3D) antenna array;
   an ultra-wideband (UWB) transceiver communicatively coupled to the antenna assembly;
   a wireless transceiver;
   an image capturing device having a field of view (FOV);
   a memory that stores a library of classification images;
   a controller communicatively coupled to the antenna assembly, the UWB transceiver, the wireless transceiver, the image capturing device, and the memory, and which configures the electronic device to:
   identify, via the wireless transceiver, proximity to one or more devices that are UWB capable;
   receive, via the UWB transceiver, UWB signals from a first device;
   determine a location of the first device based on a range and an angle of arrival of the UWB signals received from the first device;
   receive, from the image capturing device, an image stream depicting an area captured within the FOV that includes the location;

visually classify an object in the image stream corresponding to the first device using the library of classification images to identify an object classification that is associated with a device label; and assign the device label to the first device.

2. The electronic device of claim 1, wherein the controller:

receives, via the wireless transceiver, one or more wireless addresses advertised respectively by one or more UWB devices, including the first device;

orders a list of the one or more wireless addresses based on signal path loss; and transmits a request to at least the first device that is closest to the electronic device based on the list to prompt the first device to transmit the UWB signals for location finding.

3. The electronic device of claim 2, wherein the controller stores communication information comprising a corresponding wireless address of the one or more wireless addresses and the device label for the first device for subsequent use in connecting to the first device for a communication session.

4. The electronic device of claim 1, further comprising a display communicatively coupled to the controller, and the controller:

identifies one or more candidate objects in the area within the FOV that are classified as UWB devices;

ranks the one or more candidate objects based on proximity to the location of the first device based on the UWB signals;

presents, at the display, a device label associated with at least a highest ranked one of the one or more candidate objects; and visually classifies the object in the image stream in response to an input selecting the device label that is associated with the object to confirm the classification.

5. The electronic device of claim 1, wherein:

the library of images comprises one or more images of transportable objects each associated with a respective object label; and the controller:

in response to identifying the first device as a UWB tag device intended to be attached to a transportable object for wireless tracking:

classifies a transportable object in the area of the FOV using the library of images to identify a corresponding object label; and associates the object label with the device label associated with the first device attached to the transportable object.

6. The electronic device of claim 5, further comprising a display communicatively coupled to the controller, and the controller:

identifies one or more transportable objects in the area within the FOV;

ranks the one or more transportable objects based on proximity to the location of the first device;

presents at the display the object label associated with at least a highest ranked one of the one or more transportable objects; and associates the object label with the device label associated with the first device in response to an input selecting the object label.

7. A method comprising:

identifying, via a wireless transceiver of an electronic device, proximity to one or more devices comprising a first device that are ultra-wideband (UWB) capable;

receiving, a UWB transceiver and an antenna assembly of the electronic device, UWB signals from a first device, the antenna assembly comprising two or more antennas spaced in a support structure as one of a two-dimensional (2D) or a three-dimensional (3D) antenna array;

determining a location of the first device based on a range and an angle of arrival of the UWB signals received from the first device;

receiving, from an image capturing device, an image stream depicting an area captured within a field of view (FOV) that includes the location;

visually classifying an object corresponding to the first device in the image stream corresponding to the first device using a library of classification images that comprises one or more classification images of one or more devices;

identifying an object classification associated with a device label for the first device; and assigning the device label to the first device.

8. The method of claim 7, further comprising:

receiving, via the wireless transceiver, one or more wireless addresses advertised respectively by one or more UWB devices, including the first device;

ordering a list of the one or more wireless addresses based on signal path loss; and transmitting a request to at least the first device that is closest to the electronic device based on the list to prompt the first device to transmit the UWB signals for location finding.

9. The method of claim 8, further comprising storing communication information comprising a corresponding wireless address of the one or more wireless addresses and the device label for the first device for subsequent use in connecting to the first device for a communication session.

10. The method of claim 7, further comprising:

identifying one or more candidate objects in the area within the FOV that are classified as UWB devices;

ranking the one or more candidate objects based on proximity to the location of the first device based on the UWB signals;

presenting, at a display, a device label associated with at least a highest ranked one of the one or more candidate objects; and visually classifying the object in the image stream in response to an input selecting the device label that is associated with the object to confirm the classification.

11. The method of claim 7, wherein the library of images comprises one or more images of transportable objects each associated with a respective object label, the method further comprising:

in response to identifying the first device as a UWB tag device intended to be attached to a transportable object for wireless tracking:

classifying a transportable object in the area of the FOV using the library of images to identify a corresponding object label; and associating the object label with the device label associated with the first device attached to the transportable object.

12. The method of claim 11, further comprising:

identifying one or more transportable objects in the area within the FOV;

ranking the one or more transportable objects based on proximity to the location of the first device;

presenting, at a display, the object label associated with at least a highest ranked one of the one or more transportable objects; and associating the object label with the device label associated with the first device in response to an input selecting the object label.

13. A computer program product comprising:
a computer readable storage device; and
program code on the computer readable storage device that when executed by a processor associated with a communication system, the program code enables an electronic device to provide functionality of:
identifying, via a wireless transceiver of an electronic device, proximity to one or more devices comprising a first device that are ultra-wideband (UWB) capable;
receiving, a UWB transceiver and an antenna assembly of the electronic device, UWB signals from a first device, the antenna assembly comprising two or more antennas spaced in a support structure as one of a two-dimensional (2D) or a three-dimensional (3D) antenna array;
determining a location of the first device based on a range and an angle of arrival of the UWB signals received from the first device;
receiving, from an image capturing device, an image stream depicting an area captured within a field of view (FOV) that includes the location;
visually classifying an object corresponding to the first device in the image stream using a library of classification images that comprises one or more classification images of one or more devices;
identifying an object classification associated with a device label for the first device; and
assigning the device label to the first device.

14. The computer program product of claim 13, wherein the program code enables the electronic device to provide functionality of:
receiving, via the wireless transceiver, one or more wireless addresses advertised respectively by one or more UWB devices, including the first device;
ordering a list of the one or more wireless addresses based on signal path loss; and
transmitting a request to at least the first device that is closest to the electronic device based on the list to prompt the first device to transmit the UWB signals for location finding.

15. The computer program product of claim 14, wherein the program code enables the electronic device to provide functionality of storing communication information comprising a corresponding wireless address of the one or more wireless addresses and the device label for the first device for subsequent use in connecting to the first device for a communication session.

16. The computer program product of claim 13, wherein the program code enables the electronic device to provide functionality of:
identifying one or more candidate objects in the area within the FOV that are classified as UWB devices;
ranking the one or more candidate objects based on proximity to the location of the first device based on the UWB signals;
presenting, at a display, a device label associated with at least a highest ranked one of the one or more candidate objects; and
visually classifying the object in the image stream in response to an input selecting the device label that is associated with the object to confirm the classification.

17. The computer program product of claim 13, wherein:
the library of images comprises one or more images of transportable objects each associated with a respective object label; and
the program code enables the electronic device to provide functionality of:
in response to identifying the first device as a UWB tag device intended to be attached to a transportable object for wireless tracking:
classifying a transportable object in the area of the FOV using the library of images to identify a corresponding object label; and
associating the object label with the device label associated with the first device attached to the transportable object.

18. The computer program product of claim 17, wherein the program code enables the electronic device to provide functionality of:
identifying one or more transportable objects in the area within the FOV;
ranking the one or more transportable objects based on proximity to the location of the first device;
presenting, at a display, the object label associated with at least a highest ranked one of the one or more transportable objects; and
associating the object label with the device label associated with the first device in response to an input selecting the object label.

* * * * *